United States Patent
Matsuo et al.

(10) Patent No.: US 8,248,007 B2
(45) Date of Patent: Aug. 21, 2012

(54) CONTROL APPARATUS AND CONTROL METHOD FOR AC MOTOR

(75) Inventors: Noriko Matsuo, Anjo (JP); Hiroyuki Inagaki, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 331 days.

(21) Appl. No.: 12/730,793

(22) Filed: Mar. 24, 2010

(65) Prior Publication Data
US 2010/0264859 A1 Oct. 21, 2010

(30) Foreign Application Priority Data

Apr. 15, 2009 (JP) ................................ 2009-098986

(51) Int. Cl.
*H02P 6/10* (2006.01)
*H02P 31/02* (2006.01)
*H02P 21/14* (2006.01)

(52) U.S. Cl. ......... 318/400.02; 318/400.09; 318/400.15; 318/400.17; 363/34

(58) Field of Classification Search .................. 318/254, 318/439, 400.02, 400.05, 400.09, 400.15, 318/400.17; 363/34
See application file for complete search history.

(56) References Cited

U.S. PATENT DOCUMENTS

| | | | |
|---|---|---|---|
| 2006/0076911 A1* | 4/2006 | Kuroshima et al. | 318/254 |
| 2006/0082339 A1* | 4/2006 | Hamaoka et al. | 318/439 |
| 2006/0197482 A1* | 9/2006 | Harwood | 318/439 |
| 2008/0048598 A1* | 2/2008 | Shibuya | 318/400.1 |
| 2009/0128074 A1* | 5/2009 | Hu | 318/400.33 |
| 2009/0237013 A1* | 9/2009 | Sato | 318/400.02 |
| 2010/0134053 A1* | 6/2010 | Yamada et al. | 318/162 |
| 2010/0194317 A1* | 8/2010 | Ono et al. | 318/400.2 |
| 2010/0259204 A1* | 10/2010 | Imura | 318/400.02 |
| 2010/0262307 A1* | 10/2010 | Imura | 700/287 |
| 2011/0012544 A1* | 1/2011 | Schulz et al. | 318/400.02 |
| 2011/0298403 A1* | 12/2011 | Yamamoto et al. | 318/400.02 |

FOREIGN PATENT DOCUMENTS

JP 2007-159368 A 6/2007

* cited by examiner

*Primary Examiner* — Paul Ip
(74) *Attorney, Agent, or Firm* — Buchanan Ingersoll & Rooney PC

(57) ABSTRACT

A control apparatus for an AC motor controls an inverter in a pulse width modulation scheme to feed a coil current to a stator coil of a stator. A pattern switching mechanism switches a control pattern to a first pattern or to a second pattern; a first pattern calculating mechanism calculates a control signal using a first pattern parameter; a second pattern calculating mechanism calculates a control signal using a second pattern parameter; an offset calculating mechanism calculates a difference between a control signal of an old pattern and a control signal of a new pattern, and reflects the offset amount on the control signals; and a control output mechanism calculates a final control output signal on the basis of the control signals, and transmits the final control output signal to the inverter.

12 Claims, 7 Drawing Sheets

US 8,248,007 B2

CONTROL APPARATUS AND CONTROL METHOD FOR AC MOTOR

CROSS REFERENCE TO RELATED APPLICATION

This application is based on and claims priority under 35 U.S.C. §119 to Japanese Patent Application No. 2009-098986 filed on Apr. 15, 2009, the entire content of which is incorporated herein by reference.

TECHNICAL FIELD

The present invention relates to a control apparatus and a control method for a rotary magnet type AC motor and, more particularly, to a control apparatus and a control method in which an inverter is controlled in a pulse width modulation scheme so as to feed a coil current.

BACKGROUND ART

There has been known a control apparatus which controls an inverter to feed a coil current to a rotary magnet type AC motor in which a permanent magnet is provided in a rotor and a coil is provided in a stator. If an inverter is used, a frequency and a conduction phase of the coil current can be controlled, and a control scheme including a pulse width modulation scheme has been put to practical use. In addition, in order to secure high controllability, not only is an electric input is controlled according to a necessary required output, but a rotational position of the rotor and the coil current are also sequentially detected so as to perform a feed-back control, and a biaxial theory to be described later also belongs thereto.

An example of such a control apparatus is disclosed in Patent Document 1. The control apparatus of a motor driving system in Patent Document 1 is provided with a first and second motor control mechanism, and a control mode selecting mechanism selectively sets a control mode according to a driving state of the AC motor. As for the control mode, a PWM (pulse width modulation) control mode and a rectangular wave power control mode are provided, and the former mode is subdivided into a sinusoidal wave PWM and an overmodulation PWM. According to the Patent Document 1, the control apparatus can dispense with a conventionally-required voltage sensor for detecting a voltage of a DC voltage source on the input side of the inverter, and can eliminate a torque difference caused by detection error of the voltage sensor when the control mode is switched.

In addition, an electronic control apparatus is used in the control apparatus, and calculation is generally performed according to the control mode. The biaxial theory is known as a theory of controlling a three-phase rotary magnet type AC motor and is described in Non-Patent Document 1 and the like. In the biaxial theory, the direction of the N pole of the permanent magnet on the rotor is assumed as the d axis, the direction rotating by the electric angle 90° from the d axis is assumed as the q axis, a coil current vector of three phases is converted into a DC current of two axes on the dq coordinate axis based on the rotational position of the rotor, an amount of change to be controlled is obtained by performing calculation on the dq coordinate axis and then performs an inverse conversion so as to obtain an amount of change in the three phase area. By the biaxial theory, various control schemes are established for controlling a current vector of three phases.

Patent Document 1: JP-A-2007-159368
Non-Patent Document 1: Interior Permanent Magnet Synchronous Motor by Takeda, Yoji and co-writers, Obunsha, published in October 2001

When the inverter is controlled in the pulse width modulation scheme on the basis of the amount of change obtained by the biaxial theory so as to drive the AC motor, the control apparatus needs to switch the pulse width modulation scheme from the sinusoidal wave control mode to the overmodulation control mode as the required output is increased. In the sinusoidal wave control mode, since a reference triangle waveform is simply subtracted from the sinusoidal waveform corresponding to the required output so as to generate a pulse waveform representing an energizing phase, a calculation load of the control apparatus can be reduced, and the control can be performed in a short cycle time. In addition, in the overmodulation control mode, since a peak of the sinusoidal waveform exceeds the reference triangle waveform, calculation for correcting the sinusoidal waveform is necessary in addition to the subtraction, the calculation load of the control apparatus is increased, and the control requires a long cycle time to be performed. In other words, in the sinusoidal wave control mode and the overmodulation control mode, the cycle times for performing the control are different from each other.

On the other hand, in the calculation for obtaining the amount of change to be controlled on the dq coordinate axis by the biaxial theory, a constant parameter is used by a proportional-integral-derivative control (PID) or the like in many cases. The parameter may be properly set according to a period of the cycle time. If a common parameter is used in the sinusoidal wave control mode and the overmodulation control mode, the control is performed excessively so that the stability is degraded in which the output of the motor oscillates to be large or small, or too little control is performed so that responsiveness is degraded in which tracing to the load change is delayed.

In addition, when the parameters are separately used in the sinusoidal wave control mode and the overmodulation control mode, a proper control is performed in each mode, but the amount of change obtained before and after the mode switching is inconsistent, and the output may be discontinuous. If the cycle time in the sinusoidal wave control mode is made long to match with the cycle time in the overmodulation control mode, and further the common parameter is used, the inconsistency in the mode switching can be solved, but the rapid responsiveness in the sinusoidal wave control mode is sacrificed.

Thus, a need exist for a control apparatus and a control method of an AC motor, which is not susceptible to the drawback mentioned above.

SUMMARY

Under the above-mentioned circumstance and other circumstances, the present disclosure can provide, as an illustrative, non-limiting embodiment, a control apparatus for an AC motor including a rotor having a permanent magnet and a stator having a stator coil. The control apparatus is capable of controlling an inverter in a pulse width modulation scheme to feed a coil current to the stator coil. The control apparatus includes: a position detecting mechanism; a current detecting mechanism; a pattern switching mechanism configured to switch a control pattern for the AC motor to a first pattern or to a second pattern; a first pattern calculating mechanism configured to calculate a control signal using a parameter for the first pattern; a second pattern calculating mechanism configured to calculate a control signal using a parameter for the second pattern; an offset calculating mechanism configured to calculate a difference, as an offset amount, between a control signal obtained in an old pattern and a control signal obtained in a new pattern when the pattern switching mechanism switches a pattern, and to reflect the offset amount on the control signal of the new pattern; and a control output mechanism configured to calculate a final control output signal on the basis of the control signals which are obtained by the first pattern calculating mechanism, the second pattern calculating mechanism, and the offset calculating mechanism, and to transmit the final control output signal to the inverter via a pulse width modulation circuit.

DESCRIPTION OF THE PREFERRED EMBODIMENT

Figure 1:
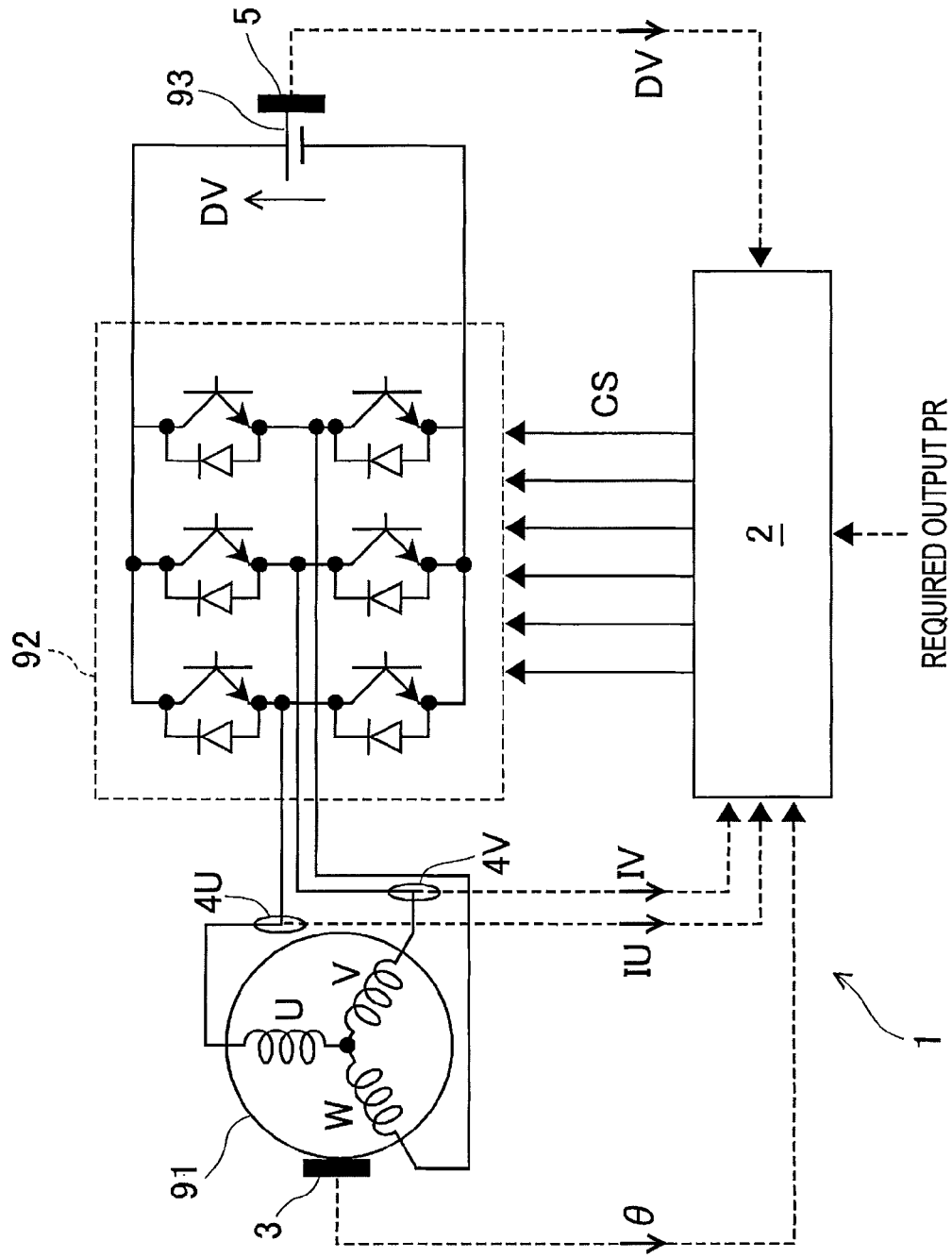
FIG. 1 is a diagram illustrating the entire configuration of a control apparatus of an AC motor according to an embodiment.

An embodiment disclosed here will be described with reference to FIGS. 1 to 5. FIG. 1 is a diagram illustrating the entire configuration of a control apparatus of an AC motor according to the embodiment. As shown in the drawing, the control apparatus 1 of the embodiment controls a three phase AC motor 91 and an inverter 92, and includes a control calculating unit 2, a rotational position sensor 3, two current sensors 4U and 4V, and a power voltage sensor 5. In the present embodiment, the sensors 3, 4U, 4V, and 5 are also considered as the configuration of the control apparatus 1.

The three phase AC motor 91 includes a rotor (not illustrated in the drawing) having a permanent magnet, and a stator having stator coils U, V, and W which are connected in star type. There is no limitation on the number of pair poles of the permanent magnet or the connection and the number of poles of the coils U, V, and W. In order to feed a coil current to the three phase AC motor 91, the inverter 92 and a DC power 93 are disposed. The inverter 92 is controlled by a pulse width control signal CS which is output from the control calculating unit 2, and intermittently controls the DC voltage DV of the DC power 93 so as to be applied to each of the coils U, V, and W. In the inverter 92, the well-known circuit configuration may be employed.

As a position detecting mechanism that detects the rotational position of the rotor of the three phase AC motor 91, a rotational position sensor 3 is disposed. The rotational position sensor 3 includes a resolver having a coil for changing an electric output according to the change in the magnetic field which is formed by the permanent magnet on the rotor, and detects the rotational position θ as an electric angle. In addition, as a current detecting mechanism that detects the coil currents IU and IV which flow in the stator coils U and V of the U phase and the V phase, two current sensors 4U and 4V are disposed. Further, a power voltage sensor 5 which detects the DC voltage DV of the DC power 93 is disposed. The outputs of the respective sensors 3, 4U, 4V, and 5 are input to the control calculating unit 2. In addition, a required output PR which is required of the three phase AC motor 91 is instructed to the control calculating unit 2 from an upper-level control apparatus which is not illustrated in the drawing.

Figure 2:
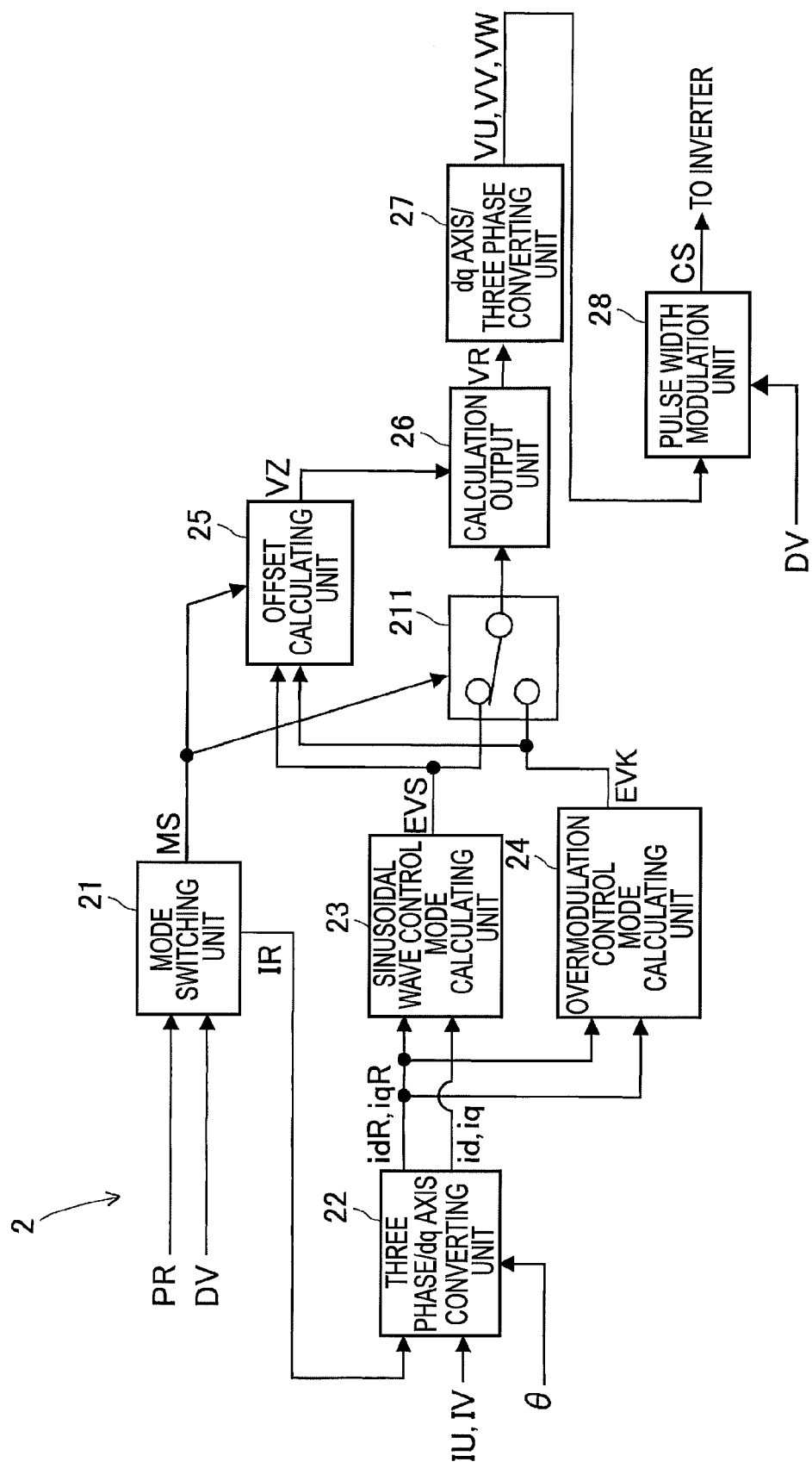
FIG. 2 is a function block diagram illustrating functions of a control and calculation unit in the control apparatus of FIG. 1.

The control calculating unit 2 includes an electronic control apparatus, which has a built-in computer and is operated by software, and a pulse width modulation circuit. The electronic control apparatus performs the calculation on the dq coordinate axis which rotates together with the rotor. FIG. 2 is a block diagram illustrating functions of the control calculating unit 2. As shown in the drawing, the control calculating unit 2 includes the functions of a mode switching unit 21, a three phase/dq axis converting unit 22, a sinusoidal wave control mode calculating unit 23, an overmodulation control mode calculating unit 24, an offset calculating unit 25, a calculation output unit 26, a dq axis/three phase converting unit 27, and a pulse width modulation unit 28.

Further, as is well known, when the three phase currents are converted onto the dq axis, the vector sum of the three phase currents is assumed to be zero. In addition, the suffix R attached to the signs and symbols in the description and the drawing to be described later represents an amount required from the upper-level control apparatus or a target amount, the suffixes d and q represent the d-axis amount and the q-axis amount, and the suffixes S and K represent the sinusoidal wave control mode (S) and the overmodulation control mode (K). In the following, each of the function units 21 to 28 will be described.

The mode switching unit 21 is a mode switching mechanism that switches the pulse width modulation mode to the sinusoidal wave control mode or the overmodulation control mode according to the magnitude of the required output PR which is required of the three phase AC motor 91. Specifically, the mode switching unit 21 first obtains the required voltage effective value V0 of three phases, which is necessary for the stator coils U, V, and W, and the required current IR on the basis of the instructed required output PR at a constant time interval TM. Next, a modulation rate (=V0/DV) which is obtained by dividing the required voltage effective value V0 by the power voltage DV of the DC power 93 is calculated, and when the modulation rate is lower than a predetermined value, the sinusoidal wave control mode is selected, and when the modulation value exceeds the predetermined value, the overmodulation control mode is selected. The mode control signal MS for switching the mode controls the switcher 211 which selectively connects the calculation output unit 26 to the sinusoidal wave control mode calculating unit 23 or to the overmodulation control mode calculating unit 24, and is transmitted to the offset calculating unit 25. In addition, the required current IR is transmitted to the three phase/dq axis converting unit 22.

In addition, in this embodiment, the mode switching unit 21 also serves as the cycle time switching mechanism. That is, the sinusoidal waveform needs to be corrected in the overmodulation control mode so as to calculate a target voltage waveform, and the cycle time TK becomes the second cycle time with a relatively long interval. On the other hand, the cycle time TS in the sinusoidal wave control mode becomes the first cycle time with a relatively short interval. Then, the mode switching unit 21 selects the cycle time TS with a short interval at the same time when the sinusoidal wave control mode is selected, and selects the cycle time TK with a long interval at the same time when the overmodulation control mode is selected.

The three phase/dq axis converting unit 22 converts the coil currents IU and IV of two detected phases into the d-axis current id and the q-axis current iq on the basis of the detected rotor rotational position θ, and also, converts the required current IR transmitted from the mode switching unit 21 into a required d-axis current idR and a required q-axis current iqR. The coil currents id and iq and the required currents idR and iqR on the dq coordinate axis are transmitted to the sinusoidal wave control mode calculating unit 23 and the overmodulation control mode calculating unit 24, respectively.

The sinusoidal wave control mode calculating unit 23 is the first control mode calculating mechanism, and corresponds to the first cycle time calculating mechanism. The sinusoidal wave control mode calculating unit 23 first subtracts the coil currents id and iq from the required currents idR and iqR on the dq coordinate axis so as to calculate a current difference E (ed, eq), and then obtains an amount of the change, that is, a voltage difference EVS (evd, evq), which is required by the calculation of the current difference E and a parameter PS for the sinusoidal wave, as the control signal. The parameter PS for the sinusoidal wave is a parameter for the first control mode, and corresponds to a parameter for the first cycle time. The obtained voltage difference EVS is transmitted to the offset calculating unit 25, and selectively transmitted to the calculation output unit 26 via the switcher 211.

The overmodulation control mode calculating unit 24 is the second control mode calculating mechanism, and corresponds to the second cycle time calculating mechanism. The overmodulation control mode calculating unit 24 first calculates the current difference E (ed, eq), and then obtains an amount of the change, that is, a voltage difference EVK (evd, evq), which is required by the calculation of the current difference E and a parameter PK for the overmodulation, as the control signal. The parameter PK for the overmodulation is a parameter for the second control mode, and corresponds to a parameter for the second cycle time. The obtained voltage difference EVK is transmitted to the offset calculating unit 25, and selectively transmitted to the calculation output unit 26 via the switcher 211.

The offset calculating unit 25 operates only when the mode control signal MS transmitted from the mode switching unit 21 is switched. Specifically, the difference of the voltage difference EVS (evd, evq) and the voltage difference EVK (evd, evq) which are obtained in an old mode and a new mode before and after the switching is calculated as the offset amount VZ (vdZ, vqZ), and the offset amount VZ is transmitted to the calculation output unit 26.

The calculation output unit 26 calculates a target voltage signal VR (vd, vq) on the basis of the voltage difference EVS (evd, evq) obtained by the sinusoidal wave control mode calculating mechanism 23, the voltage difference EVK (evd, evq) obtained by the overmodulation control mode calculating mechanism 24, and the offset amount VZ (vdZ, vqZ) obtained by the offset calculating mechanism 25, and transmits the target voltage signal to the dq axis/three phase calculating unit 27. The calculation output unit 26 holds an integral sum INV (invd, invq) which is obtained by sequentially adding the voltage differences (EVS, EVK) used for the control in the previous round, and the integral sum INV is set to the target voltage signal VR (vd, vq) of the previous round.

Then, when the mode is not switched, the integral sum INV of the previous round is added to the voltage difference (EVS or EVK) of the present round so as to be set to the integral sum INV and the target voltage signal VR of the present round. In addition, when the mode is switched, the offset amount VZ (vdZ, vqZ) is added to the integral sum INV of the previous round so as to be corrected, and then the voltage difference (EVS or EVK) of a new mode is added so as to be set to the target voltage signal VR of the present round.

The dq axis/three phase converting unit 27 inversely converts the target voltage signal VR (vd, vq) on the dq coordinate axis into the three phase area so as to obtain the coil voltage waveforms VU, VV, and VW of the target three phases, which are transmitted to the pulse width modulation unit 28. The pulse width modulation unit 28 compares the coil voltage waveforms VU, VV, and VW of three phases with an internal reference triangle waveform, and outputs the pulse width control signal CS to the inverter 92 such that the power is fed in the phase in which the former exceeds the latter. At this time, the power voltage DV of the DC power 93 is referred to. In addition, the target voltage signal VR of the calculation output unit 26 and the coil voltage waveforms VU, VV, and VW of the dq axis/three phase converting unit 27 correspond to the control output signals.

Figure 3:
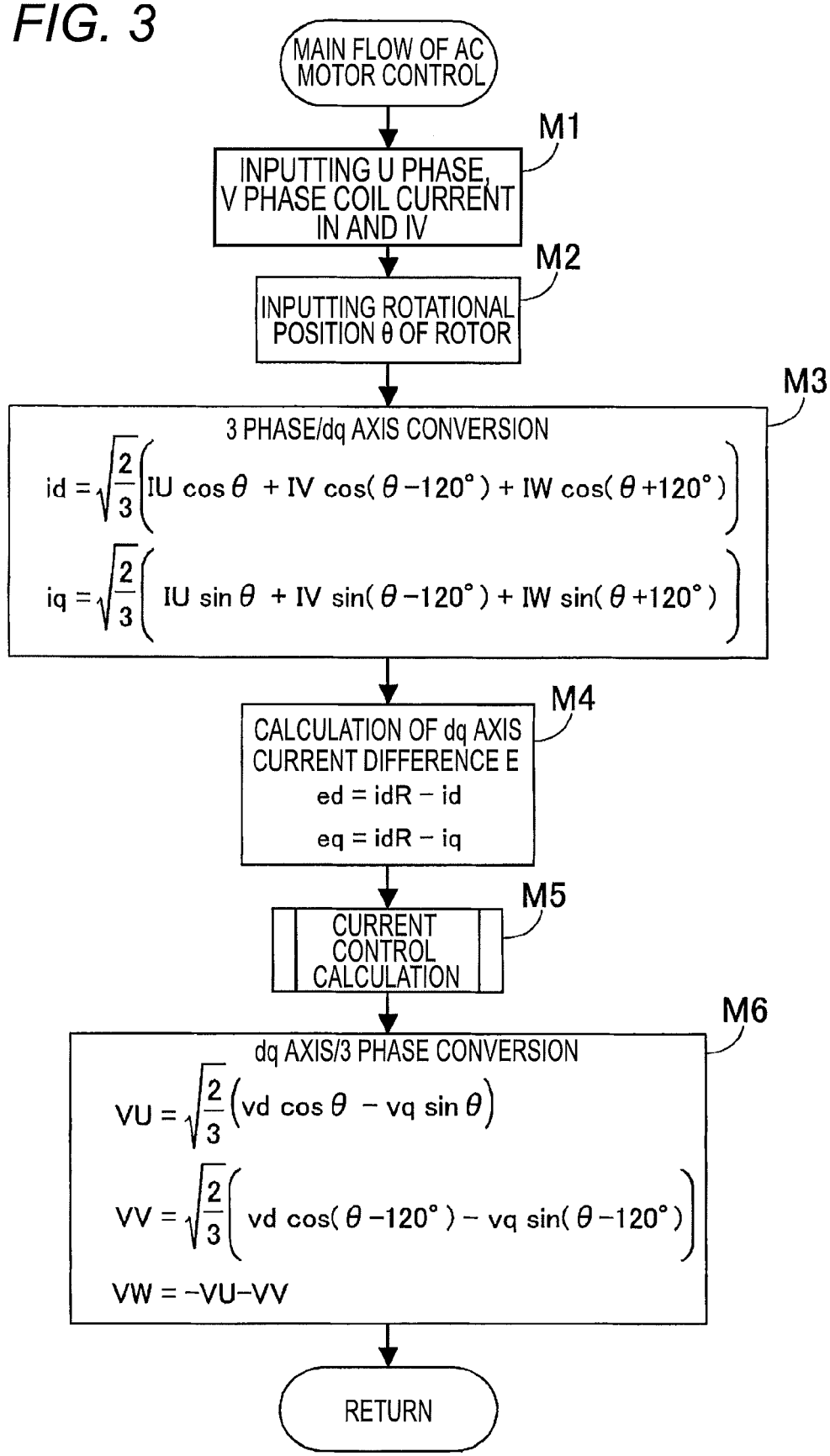
FIG. 3 is a flow chart illustrating a main flow of an AC motor control used in the control apparatus of FIG. 1.
Figure 4:
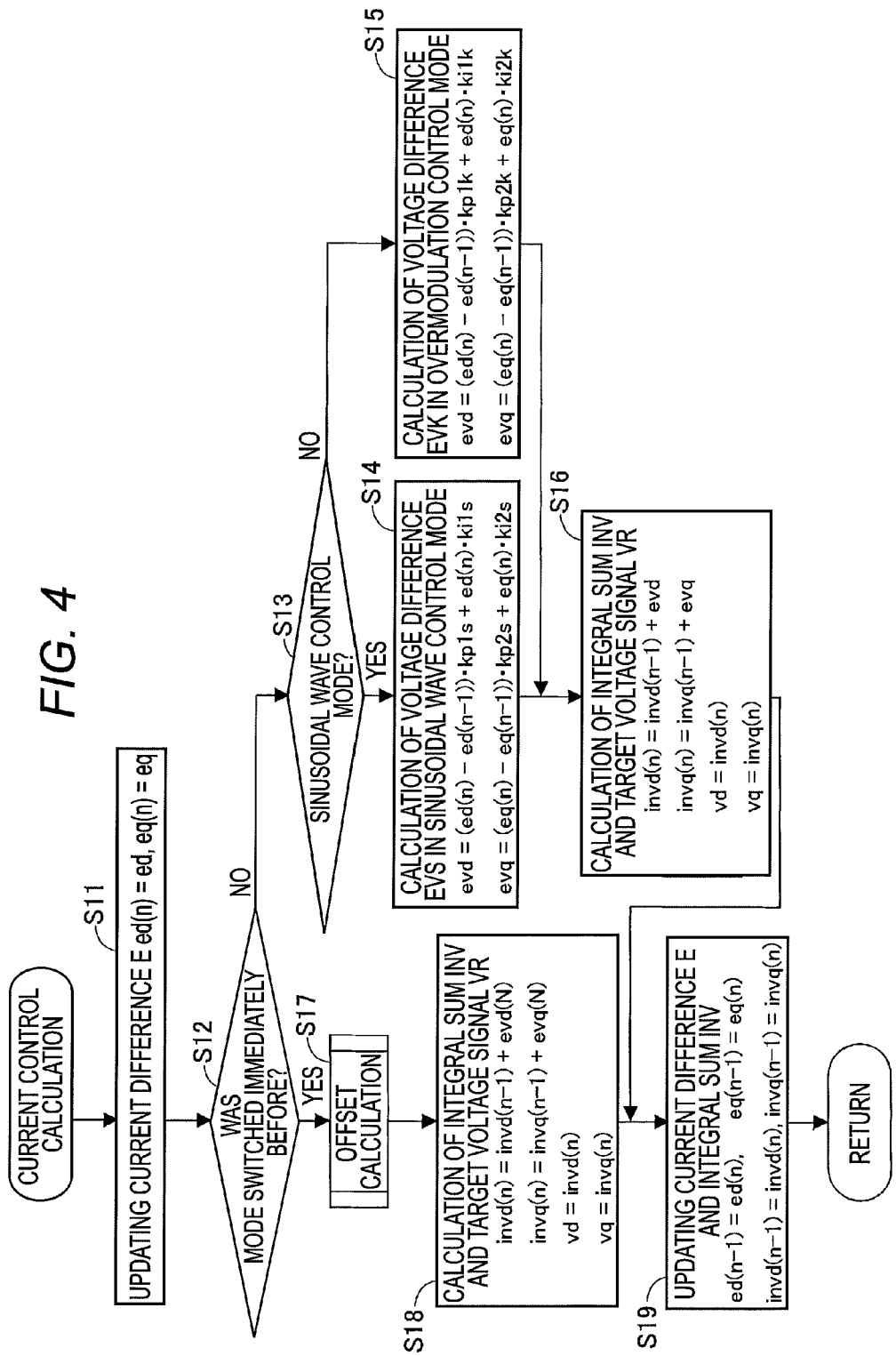
FIG. 4 is a flow chart illustrating a flow of a current controlling calculation in FIG. 3.
Figure 5:
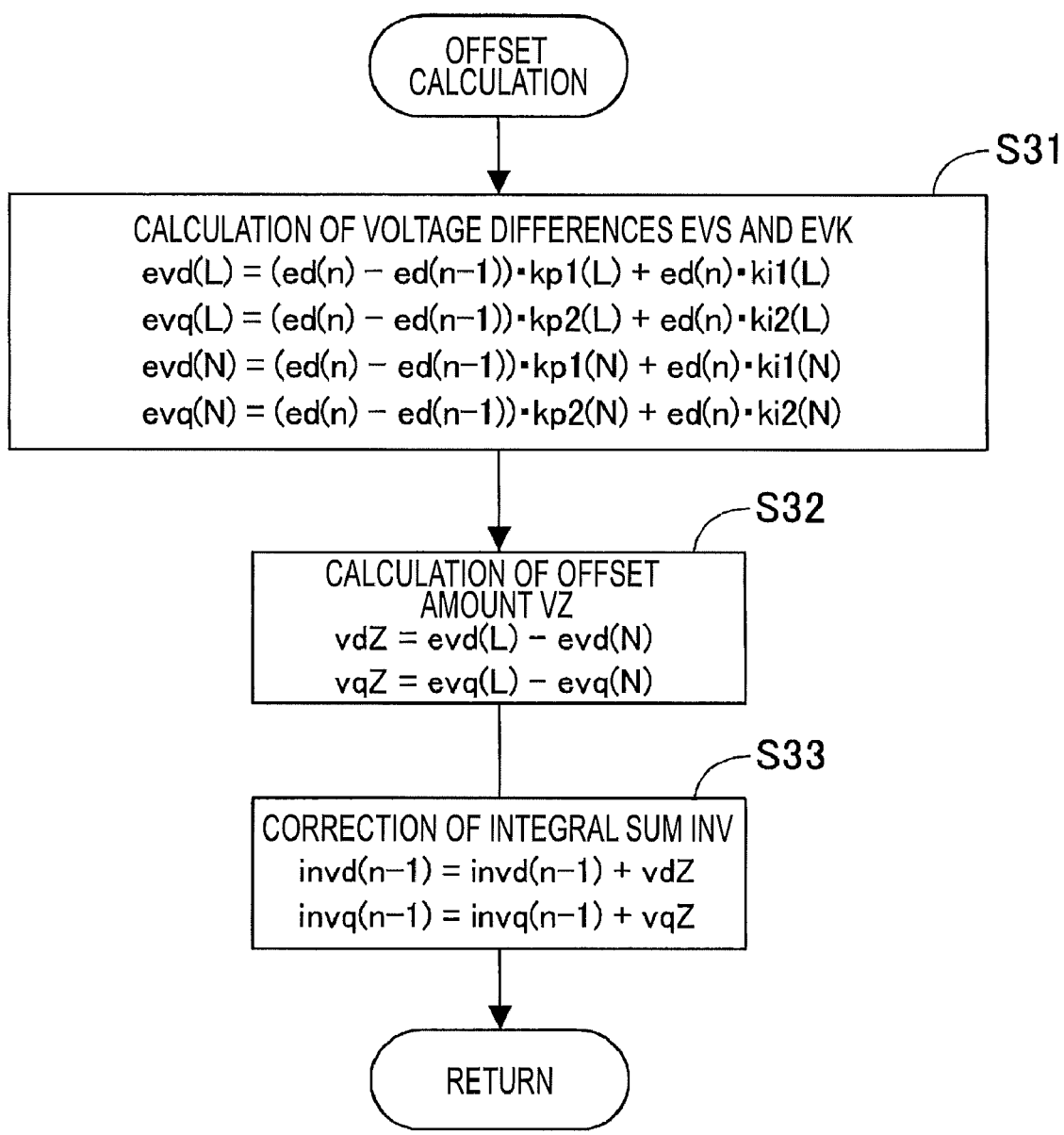
FIG. 5 is a flow chart illustrating a flow of an offset calculation in FIG. 4.

Next, the operations and the processes of the control apparatus 1 of the AC motor according to the embodiment which is configured as described above will be described with reference to a processing flow shown in FIGS. 3 to 5. FIG. 3 is a flow chart illustrating a main flow of the AC motor control; FIG. 4 is a flow chart illustrating a flow of the current control calculation shown in FIG. 3; and FIG. 5 is a flow chart illustrating a flow of an offset calculation shown in FIG. 4. In the main flow shown in FIG. 3, the cycle time in which a series of controls are performed is TS in the sinusoidal wave control mode, and TK in the overmodulation control mode (TS<TK, as described above), which are several orders smaller than a time interval TM in which the mode switching unit 21 reviews the mode. The mode switching is performed after a series of the controls is completed, and the mode is not switched in the middle of the main flow.

In the main flow shown in FIG. 3, first in Step M1, the coil currents IU and IV which are caused to flow in the stator coils U and V of the U phase and the V phase are detected by two current sensors 4U and 4V so as to be input to the control calculating unit 2. At this time, the coil current IW of the W phase in the third phase is automatically calculated because the vector sum is zero. Next, in Step M2, the rotational position θ on the rotor is detected by the rotational position sensor 3 so as to be input to the control calculating unit 2.

In Step M3, the coil currents IU, IV, and IW of three phases are converted into the d-axis current id and the q-axis current iq on the dq coordinate axis by a conversion equation based on the rotational position θ of the rotor. Even though there is no illustration in the drawing, the required current IR is also converted into the required d-axis current idR and the required q-axis current iqR by the same conversion equation. In Step M4, the coil currents (id, iq) are subtracted from the required currents (idR, iqR) on the dq coordinate axis so as to calculate the current difference E (ed, eq). The processes from Step M1 to Step M4 are implemented independently of the mode.

In the next Step M5, the target voltage signal VR (vd, vq) for controlling the current difference E (ed, eq) to be small is calculated. The calculation is shown in the current control calculation flow shown in FIG. 4. In FIG. 4, the parentheses attached to the symbol show the cycle time, (n) shows the present round value, and (n−1) shows the previous round value.

In Step S11 shown in FIG. 4, first, the present round value of the current difference E (ed, eq) is replaced with the latest value which is brought from the main flow. Next, in Step S12, it is determined whether or not the mode has just been switched. When the mode has not just been switched, the procedure proceeds to Step S13. In Step S13, the current mode is confirmed. When the mode is the sinusoidal wave control mode, the procedure proceeds to Step S14, and when the mode is the overmodulation control mode, the procedure proceeds to Step S15.

In the voltage difference EVS calculation in the sinusoidal wave control mode of Step S14, an amount of the change required of the proportional integral control, that is, the voltage difference EVS (evd, evq), is obtained as the control signal. Here, the calculation equation of obtaining the d-axis voltage difference evd using the parameter PS for the sinusoidal wave is expressed by the linear sum of a proportional term relating to the change (ed(n)−ed(n−1)) of the current difference and an integral term relating to the present round value ed(n) of the current difference. Then, a parameter kp1s which is multiplied by the proportional term and a parameter ki1s which is multiplied by the integral term are properly determined in synchronization with the cycle time TS of the sinusoidal wave control mode. Similarly, the parameters kp2s and ki2s for obtaining the q-axis voltage difference evq are also properly determined.

Also in the calculation of the voltage difference EVK in the overmodulation control mode of Step S15, the same calculation equation as in Step S14 is used, and the value of the parameter PK for the overmodulation is different. Four parameters PK (kp1k, ki1k, kp2k, and ki2k) for overmodulation are properly determined in synchronization with the cycle time TK in the overmodulation control mode.

Further, the parameter PS for the sinusoidal wave and the parameter PK for the overmodulation can be set by using an equipment constant of the AC motor 91, a change rate of the required output PR and the like. Alternatively, the parameters may be set with reference to a result obtained by performing a comparison experiment by changing the values of the parameters.

In Step S16 following Step 14 and Step S15, the present round value of the integral sum INV (invd, invq) is calculated. That is, the voltage difference (EVS or EVK) obtained in Step S14 or Step S15 is added to the previous round value of the integral sum INV so as to become the present round value of the integral sum INV. Then, the present round value of the integral sum INV becomes the present round value of the target voltage signal VR (vd, vq), and the procedure proceeds to Step S19.

On the other hand, when it is determined that the mode has just been switched in Step S12, the procedure proceeds to the offset calculation of Step S17. The offset calculation is shown in the offset calculating flow shown in FIG. 5. In FIG. 5, the suffixes L and N attached to the symbol represent an old mode L and a new mode N when the mode is switched.

In Step S31 shown in FIG. 5, first, the voltage differences (EVS and EVK) in both new and old modes are obtained. The calculation is the same as that in Step 14 and Step S15 shown in FIG. 4. Next, in Step S32, the voltage difference (EVK or EVS) in a new mode is subtracted from the voltage difference (EVS or EVK) in an old mode so as to obtain the offset amount VZ (vdZ, vqZ). Next, in Step S33, the offset amount VZ is added to the previous round value of the integral sum INV (invd, invq) calculated in the previous round so as to be corrected. The offset calculation is completed in Step S33, and the previous round value of the corrected integral sum INV is brought back to Step S18 shown in FIG. 4.

In Step S18 shown in FIG. 4, using the same equation as that in Step S16, the voltage difference (EVS or EVK) obtained in a new mode is added to the previous round value of the corrected integral sum INV (invd, invq), and the present round value of the integral sum INV is calculated. Then, the present round value of the integral sum INV becomes the present round value of the target voltage signal VR (vd, vq) and is joined to Step S19.

In Step S19, the current difference E (ed, eq) and the integral sum INV (invd, invq) which are used in the present round calculation are updated as the previous round value, and the preparation is made for the next round calculation. The current control calculation is completed in Step S19, and the present round value of the target voltage signal VR (vd, vq) obtained in Step S16 or Step S18 is brought back to Step M6 of the main flow shown in FIG. 3.

In Step M6, the target voltage signal VR (vd, vq) on the dq coordinate axis is inversely converted into the coil voltage waveforms VU, VV, and VW of the target three phases. The pulse width control signal CS is obtained on the basis of the coil voltage waveforms VU, VV, and VW.

The processes of the main flow described above are repeatedly performed at the cycle time (which is TS in the sinusoidal wave control mode, and TK in the overmodulation control mode) of the mode selected by the mode switching unit 21.

Figure 6:
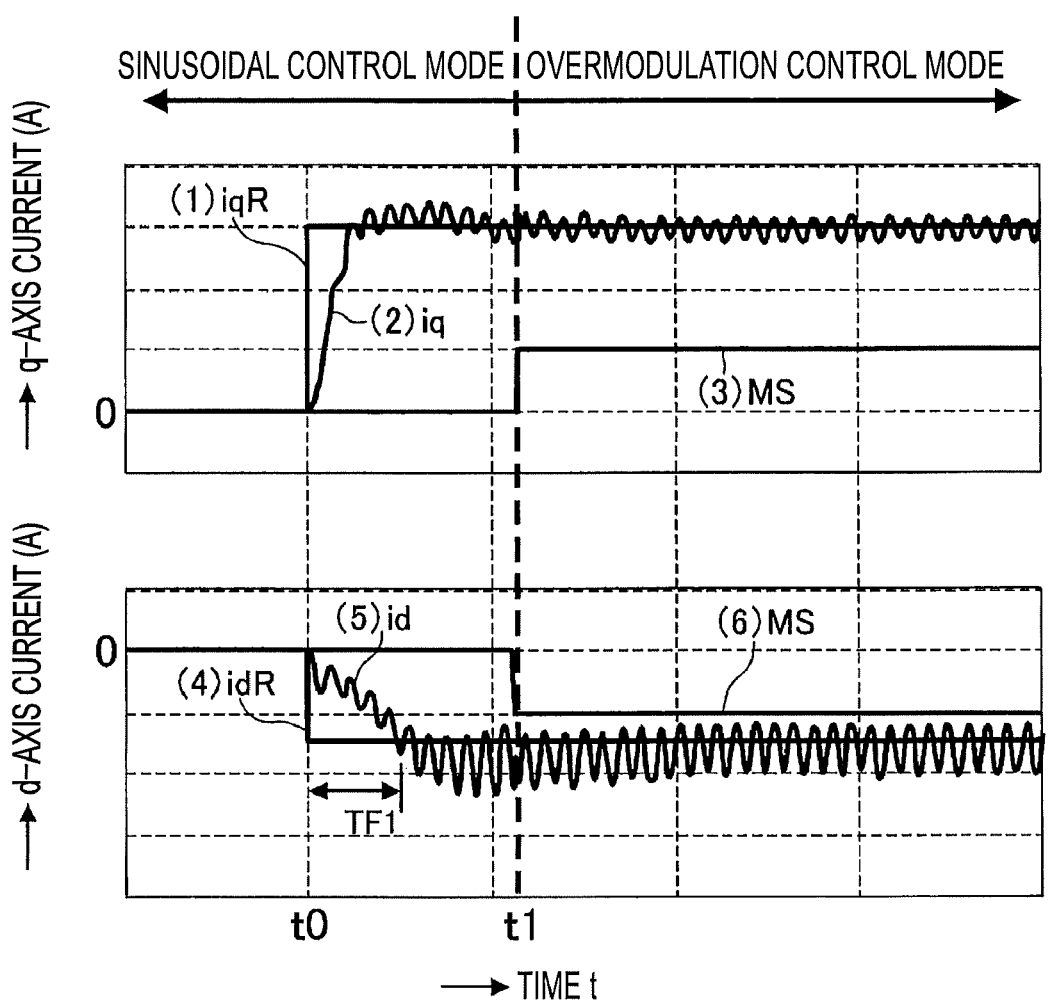
FIG. 6 is a diagram illustrating waveforms of a d-axis current and a q-axis current which are an experiment result of controlling a three phase AC motor and an inverter by the control apparatus of FIG. 1.

Next, the operation and the effect of the control apparatus 1 according to the embodiment will be described with reference to an experiment result. FIG. 6 is a diagram illustrating waveforms of the d-axis current and the q-axis current in an experiment result of controlling the three phase AC motor 91 and the inverter 92 by the control apparatus 1 of the embodiment. The horizontal axis in the drawing is a common time axis t, and the vertical axis shows a current value. In the upper graph, (1) shows the required q-axis current iqR, (2) shows an actually measured q-axis current iq. In the lower graph, (4) shows the required d-axis current idR, and (5) shows an actually measured d-axis current id. Further, (3) in the upper graph and (6) in the lower graph are the mode control signals MS representing the switching of the mode, and there is no meaning as a current value. The experiment is performed under a condition where a constant required output PR which is comparatively large at time t0 is required. The mode is switched from the sinusoidal wave control mode to the overmodulation control mode at time t1. The cycle time in the sinusoidal wave control mode TS is larger than the cycle time in the overmodulation control mode TK (TS<TK), and the parameter PS optimal for the sinusoidal wave and the parameter PK optimal for the overmodulation are set in synchronization with the respective cycle times TS and TK.

As shown in FIG. 6, the required q-axis current iqR in (1) and the required d-axis current idR in (4) are changed in a step shape at time t0 and the actually measured q-axis current iq in (2) and the actually measured d-axis current id in (5) follow this change. A response time TF1 is a time until the latter substantially matches with the former. In addition, the q-axis current iq in (2) and the d-axis current id in (5) are substantially stabilized and follow even though there is slight oscillation, and continuously change even when the mode is switched at time t1.

Figure 7B:
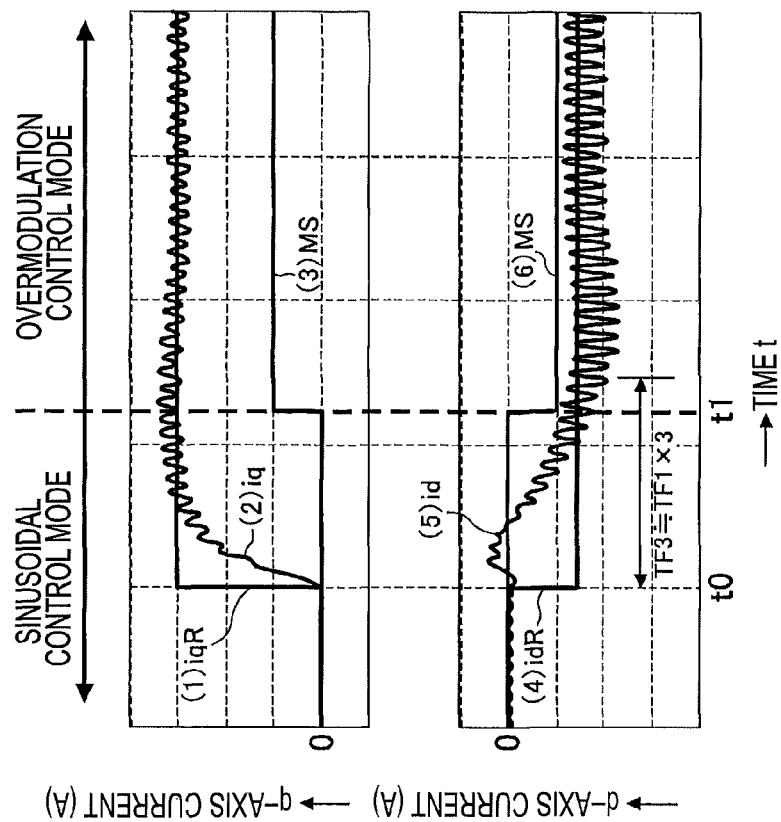
FIGS. 7A and 7B are diagrams, each illustrating waveforms of a d-axis current and a q-axis current which are comparative experiment result of controlling a three phase AC and an inverter by a comparative control apparatus.
Figure 7A:
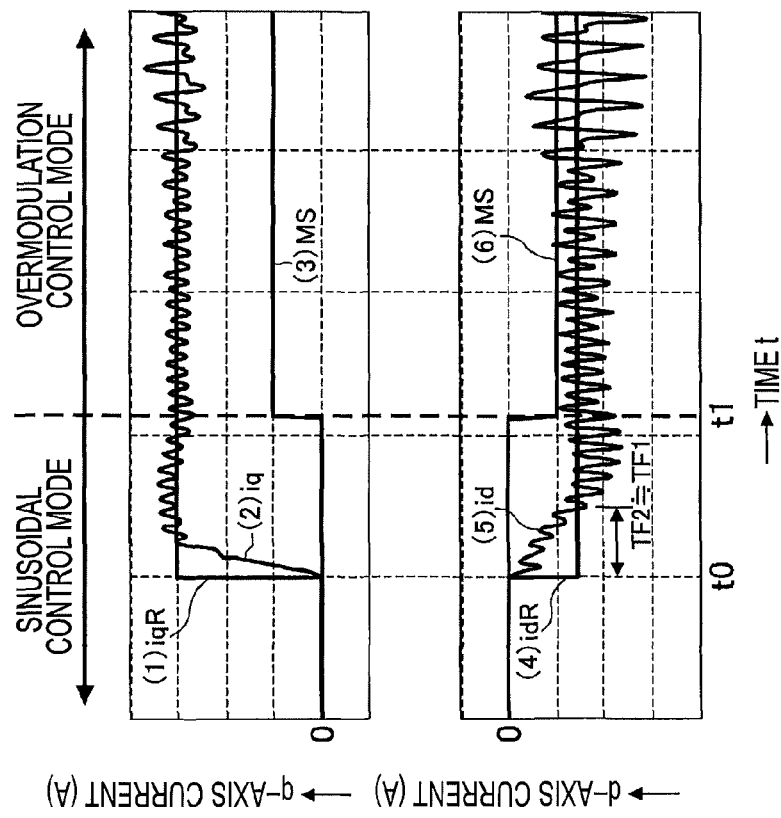

On the other hand, in the comparative experiment performed by the comparative control apparatus, the waveforms of the d-axis current and the q-axis current shown in FIGS. 7A and 7B are obtained. The three phase AC motor 91 and the inverter 92 used in the comparative experiment are the same as those in the experiment shown in FIG. 6, and the experiment conditions are equal as well as the required load PR. In this case, when the target voltage signal VR (vd, vq) is calculated, only the parameter PS for the sinusoidal wave is used in FIG. 7A, and only the parameter PK for the overmodulation is used in FIG. 7B. That is, the comparative control apparatus of FIG. 7A operates optimally at the cycle time TS, and the comparative control apparatus of FIG. 7B operates optimally at the cycle time TK.

According to the control apparatus of FIG. 7A, until the time reaches t1 in which the mode is switched, the q-axis current iq in (2) and the d-axis current id in (5) are obtained as in FIG. 6, and the response time TF2 is substantially identical to the response time TF1 in the embodiment. However, in the overmodulation control mode after time t1, the oscillation of the q-axis current iq in (2) and the d-axis current id in (5) increases so as not to be stabilized. The degradation in the stabilization is caused by mismatching between the parameter PS for the sinusoidal wave with which the apparatus operates optimally at the cycle time TS and the actual cycle time TK in the overmodulation control mode.

In addition, according to the comparative control apparatus of FIG. 7B, the response time TF3 after the required output PR is instructed at time t0 is significantly extended to roughly 3 times the response time TF1 of the embodiment shown in FIG. 6. The degradation in the responsiveness is caused by mismatching between the parameter PK for the overmodulation with which the apparatus operates optimally at the cycle time TK and the actual cycle time TS in the sinusoidal wave control mode.

As can be seen by comparing FIG. 6 with FIGS. 7A and 7B, the control apparatus 1 of the embodiment is excellent in both the stabilization and the responsiveness compared with the comparative control apparatus. In addition, even though not verified directly, in FIG. 6, the reason that the q-axis current iq in (2) and the d-axis current id in (5) before and after the mode is switched at time t1 are continuously changed is because the offset calculating unit 25 operates. If the offset calculating unit 25 is not provided, there is no consistency in the target voltage signal VR (vd, vq) before and after the mode is switched, so that the controllability is degraded.

The dq coordinate axis is used in order to simplify the calculation in this embodiment, but it is not an essential condition, and other calculation schemes may be used. In addition, the calculation for obtaining the voltage differences EVS and EVK in Step S14 and Step S15 of FIG. 4 is performed by the proportional-integral-derivative control, but other control schemes may be used.

In addition, in this embodiment, the description has been made such that the cycle time as a control pattern is switched at the same time as when the sinusoidal wave control mode and the overmodulation control mode as a control pattern are switched so as to favorably secure the stabilization and the responsiveness in output, but the invention is not limited thereto. The invention may be applied to a case where the cycle time as the control pattern is switched while the same control mode is maintained, or on the contrary, a case where the control mode as the control pattern is switched while the same cycle time is maintained. Further, it is possible to apply the technology disclosed here in various manners.

As discussed above, the present disclosure can provide, at least, the following illustrative, non-limiting embodiments.

(1) A control apparatus for an AC motor including a rotor having a permanent magnet and a stator having a stator coil, the control apparatus capable of controlling an inverter in a pulse width modulation scheme to feed a coil current to the stator coil, the apparatus including: a position detecting mechanism configured to detect a rotational position of the rotor; a current detecting mechanism configured to detect the coil current; a pattern switching mechanism configured to switch a control pattern for the AC motor to a first pattern when a required output of the AC motor is smaller than a predetermined value and to a second pattern when the required output is larger than the predetermined value; a first pattern calculating mechanism configured to calculate a control signal using a parameter for the first pattern on the basis of the detected rotational position and coil current in the first pattern; a second pattern calculating mechanism configured to calculate a control signal using a parameter for the second pattern on the basis of the detected rotational position and coil current in the second pattern; an offset calculating mechanism configured to calculate a difference, as an offset amount, between a control signal obtained in an old pattern immediately before switching and a control signal obtained in a new pattern immediately after switching when the pattern switching mechanism switches a pattern, and to reflect the offset amount on the control signal of the new pattern; and a control output mechanism configured to calculate a final control output signal on the basis of the control signals which are obtained by the first pattern calculating mechanism, the second pattern calculating mechanism, and the offset calculating mechanism, and to transmit the final control output signal to the inverter via a pulse width modulation circuit.

According to the control apparatus of (1), the pattern switching mechanism selects the first pattern or the second pattern according to the required output which is required of the AC motor, the first pattern calculating mechanism or the second pattern calculating mechanism calculates the control signal using each parameter in each mode, the control output mechanism calculates the final control output signal on the basis of the calculation result and transmits the final control signal to the inverter via the pulse width modulation circuit. Therefore, the parameter of each pattern can be separately set, and a proper control is performed so as to secure the stability and the responsiveness in the motor output. In addition, when the pattern switching mechanism switches the pattern, the offset calculating mechanism operates to calculate a difference of the control signal before and after the switching as an offset amount, and reflects the offset amount on the control signal of a new pattern. Therefore, the control before and after the pattern switching is consistent, and the motor output changes smoothly. As described above, in each pattern, or even in the pattern switching, the control is suitably performed.

(2) The control apparatus of (1), wherein the pattern switching mechanism includes a mode switching mechanism configured to switch the pulse width modulation scheme to a first control mode when the required output of the AC motor is smaller than a predetermined value and to a second control mode when the required output is larger than the predetermined value, wherein the first pattern calculating mechanism includes a first control mode calculating mechanism configured to calculate a control signal using a parameter for the first control mode on the basis of the detected rotational position and coil current in the first control mode, wherein the second pattern calculating mechanism includes a second control mode calculating mechanism configured to calculate a control signal using a parameter for the second control mode on the basis of the detected rotational position and coil current in the second control mode, and wherein the offset calculating mechanism is configured to calculate a difference between a control signal obtained in an old mode immediately before switching and a control signal obtained in a new mode immediately after switching, and to reflect the offset amount on the control signal of the new mode.

According to the control apparatus of (2), the mode switching mechanism selects the first control mode or the second control mode according to the required output which is required of the AC motor, the first control mode calculating mechanism or the second control mode calculating mechanism calculates the control signal using each parameter in each mode, the control output mechanism calculates the final control output signal on the basis of the calculation result and transmits the final control signal to the inverter via the pulse width modulation circuit. Therefore, the parameter of each mode can be separately set, and a proper control is performed so as to secure the stability and the responsiveness in the motor output. In addition, when the mode switching mechanism switches the mode, the offset calculating mechanism operates to calculate a difference of the control signal before and after the switching as an offset amount, and reflects the offset amount on the control signal of a new mode. Therefore, the control before and after the mode switching is consistent, and the motor changes smoothly. As described above, in each mode, or even in the mode switching, the control is suitably performed.

(3) The control apparatus of (1), wherein the pattern switching mechanism includes a cycle time switching mechanism configured to switch to a first cycle time having a comparatively short period when a required output of the AC motor is smaller than a predetermined value and to a second cycle time having a comparatively long period when the required output is larger than the predetermined value, wherein the first pattern calculating mechanism includes a first cycle time calculating mechanism configured to calculate a control signal using a parameter for the first cycle time on the basis of the detected rotational position and coil current in the first cycle time, wherein the second pattern calculating mechanism includes a second cycle time calculating mechanism configured to calculate a control signal using a parameter for the second cycle time on the basis of the detected rotational position and coil current in the second cycle time, and wherein the offset calculating mechanism is configured to calculate a difference between a control signal obtained in an old cycle time immediately before switching and a control signal obtained in a new cycle time immediately after switching as an offset amount, and to reflect the offset amount on the control signal in the new cycle time.

According to the control apparatus of (3), the cycle time switching mechanism selects the first cycle time or the second cycle time according to the required output which is required of the AC motor, the first cycle time calculating mechanism or the second cycle time calculating mechanism calculates the control signal using each parameter in each cycle time, the control output mechanism calculates the final control output signal on the basis of the calculation result and transmits the final control signal to the inverter via the pulse width modulation circuit. Therefore, the parameter of each pattern can be separately set on the basis of each cycle time, and a proper control is performed so as to secure the stability and the responsiveness in the motor output. In addition, when the cycle time switching mechanism switches the cycle time, the offset calculating mechanism operates to calculate a difference of the control signal before and after the switching as an offset amount, and the offset amount is reflected on the control signal of a new cycle time. Therefore, the control before and after the cycle time switching is consistent, and the motor output changes smoothly. As described above, in each cycle time, or even in the cycle time switching, the control is suitably performed.

(4) The control apparatus of (1), wherein each of the first and second pattern calculating mechanisms is configured to first calculate a deviation between a required current corresponding to the required output and the detected coil current, and then obtain an amount of change which is necessary for a calculation of the deviation and a parameter for the first or the second pattern so as to set the amount of change to the control signal, wherein the offset calculating mechanism is configured to add the offset amount to the control signal of the new pattern, and wherein the control output mechanism is configured to add a control output signal transmitted in a previous round to the control signal so as to be set to a control output signal in a present round.

According to the control apparatus of (4), the first and second pattern calculating mechanism firstly calculates a deviation between the required current and the coil current, and then obtains the amount of change which is required by the calculation between the deviation and parameter as the control signal, and the control output mechanism sets the sum of the previous control output signal and the amount of change as the control output signal at that time. Therefore, at a normal time in which the required current is not largely changed, the control output signal is slightly changed so as to definitely remove the deviation in the current, and the stability in the control is favorably maintained. In addition, when the required current is changed so as to switch the pattern, the offset calculating mechanism performs the correction of adding the offset amount to the control signal of the pattern so that the control output signal is continuously changed. Therefore, the control moves smoothly to a new pattern so as to trace the change, and the responsiveness of the control becomes good.

(5) The control apparatus of (2), wherein each of the first and second control mode calculating mechanisms is configured to first calculate a deviation between a required current corresponding to the required output and the detected coil current, and then obtain an amount of change which is necessary for a calculation of the deviation and a parameter for the first or the second control mode so as to set the amount of change to the control signal, wherein the offset calculating mechanism is configured to add the offset amount to the control signal of the new mode, and wherein the control output mechanism is configured to add a control output signal transmitted in a previous round to the control signal so as to be set to a control output signal to be transmitted in a present round.

According to the control apparatus of (5), the first and second control mode calculating mechanism firstly calculates a deviation between the required current and the coil current, and then obtains the amount of change which is required by the calculation between the deviation and parameter as the control signal, and the control output mechanism sets the sum of the previous control output signal and the amount of change as the control output signal at that time. Therefore, at a normal time in which the required current is not largely changed, the control output signal is slightly changed so as to definitely remove the deviation in the current, and the stability in the control is favorably maintained. In addition, when the required current is changed so as to switch the mode, the offset calculating mechanism performs the correction of adding the offset amount to the control signal of the mode so that the control output signal is continuously changed. Therefore, the control moves smoothly to a new mode so as to trace the change, and the responsiveness of the control becomes good.

(6) The control apparatus of (3), wherein each of the first and second cycle time calculating mechanisms is configured to first calculate a deviation between a required current corresponding to the required output and the detected coil current, and then obtain an amount of change which is necessary for a calculation of the deviation and a parameter for the first or the second cycle time so as to set the amount of change to the control signal, wherein the offset calculating mechanism is configured to add the offset amount to the control signal of the new cycle time, and wherein the control output mechanism is configured to add a control output signal transmitted in a previous round to the control signal so as to be set to a control output signal to be transmitted in a present round.

According to the control apparatus of (6), the first and second cycle time calculating mechanism firstly calculates a deviation between the required current and the coil current, and then obtain the amount of change which is required by the calculation between the deviation and parameter as the control signal, and the control output mechanism sets the sum of the previous control output signal and the amount of change as the control output signal at that time. Therefore, at a normal time in which the required current is not largely changed, the control output signal is slightly changed so as to definitely remove the deviation in the current, and the stability in the control is favorably maintained. In addition, when the required current is changed so as to switch the cycle time, the offset calculating mechanism performs the correction of adding the offset amount to the control signal of the cycle time so that the control output signal is continuously changed. Therefore, the control moves smoothly to a new cycle time so as to trace the change, and the responsiveness of the control becomes good.

(7) The control apparatus of (1), wherein the AC motor is a three phase AC motor, and wherein each of the first and second pattern calculating mechanisms, the offset calculating mechanism, and the control output mechanism is configured to execute calculation using a dq coordinate axis based on a direction of the permanent magnet on the rotor.

According to the control apparatus of (7), the calculation is performed on the three phase current motor as a target using the dq coordinate axis based on a direction of the permanent magnet on the rotor. Therefore, the calculation is simplified by using the d-axis current and the q-axis current of direct current, and various control schemes for controlling the coil current, for example, a maximum torque/current control scheme, may be applied.

(8) The control apparatus of (2), wherein the AC motor is a three phase AC motor, and wherein each of the first and second control mode calculating mechanisms, the offset calculating mechanism, and the control output mechanism is configured to execute calculation using a dq coordinate axis based on a direction of the permanent magnet on the rotor.

According to the control apparatus of (8), the calculation is performed on the three phase current motor as a target using the dq coordinate axis based on a direction of a permanent magnet on the rotor. Therefore, the calculation is simplified by using the d-axis current and the q-axis current of direct current, and various control schemes for controlling the coil current, for example, a maximum torque/current control scheme, may be applied.

(9) The control apparatus of (3), wherein the AC motor is a three phase AC motor, and wherein each of the first and second cycle time calculating mechanisms, the offset calculating mechanism, and the control output mechanism is configured to execute calculation using a dq coordinate axis based on a direction of the permanent magnet on the rotor.

According to the control apparatus of (9), the calculation is performed on the three phase current motor as a target using the dq coordinate axis based on a direction of a permanent magnet on the rotor. Therefore, the calculation is simplified by using the d-axis current and the q-axis current of direct current, and various control schemes for controlling the coil current, for example, a maximum torque/current control scheme, may be applied.

(10) A control method for an AC motor including a rotor having a permanent magnet and a stator having a stator coil, the control method capable of controlling an inverter in a pulse width modulation scheme to feed a coil current to the stator coil, the method including: a detecting step of detecting a rotational position of the rotor and the coil current; a pattern switching step of switching a control pattern for the AC motor to a first pattern when a required output of the AC motor is smaller than a predetermined value and to a second pattern when the required output is larger than the predetermined value; a first pattern calculating step of calculating a control signal using a parameter for the first pattern on the basis of the detected rotational position and coil current in the first pattern; a second pattern calculating step of calculating a control signal using a parameter for the second pattern on the basis of the detected rotational position and coil current in the second pattern; an offset calculating step of calculating a difference between a control signal obtained in an old pattern immediately before switching and a control signal obtained in a new pattern immediately after switching as an offset amount when a pattern is switched in the pattern switching step, and reflecting the offset amount on the control signal of the new pattern; and a control output step of calculating a final control output signal on the basis of calculation results of the first pattern calculating step, the second pattern calculating step, and the offset calculating step and transmitting the final control output signal to the inverter.

According to the control method of (10), the calculation is performed using a proper parameter in the first pattern and the second pattern, so that the stability and the responsiveness of the motor output can be secured, and the control signal is consistent before and after the pattern switching so that the motor output is continuously switched, and thus the controllability is good.

(11) The control method of (10), wherein the pattern switching step includes a mode switching step of switching the pulse width modulation scheme to a first control mode when a required output of the AC motor is smaller than a predetermined value and to a second control mode when the required output is larger than the predetermined value, wherein the first pattern calculating step includes a first control mode calculating step of calculating a control signal using a parameter for the first control mode on the basis of the detected rotational position and coil current in the first control mode, and wherein the second pattern calculating step includes a second control mode calculating step of calculating a control signal using a parameter for the second control mode on the basis of the detected rotational position and coil current in the second control mode.

According to the control method of (11), the calculation is performed using a proper parameter in the first control mode and the second control mode, so that the stability and the responsiveness of the motor output can be secured, and the control signal is consistent before and after the mode switching so that the motor output is continuously switched, and thus the controllability is good.

(12) The control method of (10), wherein the pattern switching step includes a cycle time switching step of switching to a first cycle time having a comparatively short period when a required output of the AC motor is smaller than a predetermined value and to a second cycle time having a comparatively long period when the required output is larger than the predetermined value, wherein the first pattern calculating step includes a first cycle time calculating step of calculating a control signal using a parameter for the first cycle time on the basis of the detected rotational position and coil current in the first cycle time, and wherein the second pattern calculating step includes a second cycle time calculating step of calculating a control signal using a parameter for the second cycle time on the basis of the detected rotational position and coil current in the second cycle time.

According to the control method of (12), the calculation is performed using a proper parameter in the first cycle time and the second cycle time, so that the stability and the responsiveness of the motor output can be secured, and the control signal is consistent before and after the cycle time switching so that the motor output is continuously switched, and thus the controllability is good.

The principles, preferred embodiment and mode of operation of the present invention have been described in the forgoing specification. However, the invention which is intended to be protected is not be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A control apparatus for an AC motor including a rotor having a permanent magnet and a stator having a stator coil, the control apparatus capable of controlling an inverter in a pulse width modulation scheme to feed a coil current to the stator coil, the apparatus comprising:
   a position detecting mechanism configured to detect a rotational position of the rotor;
   a current detecting mechanism configured to detect the coil current;
   a pattern switching mechanism configured to switch a control pattern for the AC motor to a first pattern when a required output of the AC motor is smaller than a predetermined value and to a second pattern when the required output is larger than the predetermined value;
   a first pattern calculating mechanism configured to calculate a control signal using a parameter for the first pattern on the basis of the detected rotational position and coil current in the first pattern;
   a second pattern calculating mechanism configured to calculate a control signal using a parameter for the second pattern on the basis of the detected rotational position and coil current in the second pattern;
   an offset calculating mechanism configured to calculate a difference, as an offset amount, between a control signal obtained in an old pattern immediately before switching and a control signal obtained in a new pattern immediately after switching when the pattern switching mechanism switches a pattern, and to reflect the offset amount on the control signal of the new pattern; and
   a control output mechanism configured to calculate a final control output signal on the basis of the control signals which are obtained by the first pattern calculating mechanism, the second pattern calculating mechanism, and the offset calculating mechanism, and to transmit the final control output signal to the inverter via a pulse width modulation circuit.

2. The control apparatus according to claim 1,
   wherein the pattern switching mechanism includes a mode switching mechanism configured to switch the pulse width modulation scheme to a first control mode when the required output of the AC motor is smaller than a predetermined value and to a second control mode when the required output is larger than the predetermined value,
   wherein the first pattern calculating mechanism includes a first control mode calculating mechanism configured to calculate a control signal using a parameter for the first control mode on the basis of the detected rotational position and coil current in the first control mode,
   wherein the second pattern calculating mechanism includes a second control mode calculating mechanism configured to calculate a control signal using a parameter for the second control mode on the basis of the detected rotational position and coil current in the second control mode, and
   wherein the offset calculating mechanism is configured to calculate a difference between a control signal obtained in an old mode immediately before switching and a control signal obtained in a new mode immediately after switching, and to reflect the offset amount on the control signal of the new mode.

3. The control apparatus according to claim 1,
   wherein the pattern switching mechanism includes a cycle time switching mechanism configured to switch to a first cycle time having a comparatively short period when a required output of the AC motor is smaller than a predetermined value and to a second cycle time having a comparatively long period when the required output is larger than the predetermined value,
   wherein the first pattern calculating mechanism includes a first cycle time calculating mechanism configured to calculate a control signal using a parameter for the first cycle time on the basis of the detected rotational position and coil current in the first cycle time,
   wherein the second pattern calculating mechanism includes a second cycle time calculating mechanism configured to calculate a control signal using a parameter for the second cycle time on the basis of the detected rotational position and coil current in the second cycle time, and
   wherein the offset calculating mechanism is configured to calculate a difference between a control signal obtained in an old cycle time immediately before switching and a control signal obtained in a new cycle time immediately after switching as an offset amount, and to reflect the offset amount on the control signal in the new cycle time.

4. The control apparatus according to claim 1,
   wherein each of the first and second pattern calculating mechanisms is configured to first calculate a deviation between a required current corresponding to the required output and the detected coil current, and then obtain an amount of change which is necessary for a calculation of the deviation and a parameter for the first or the second pattern so as to set the amount of change to the control signal,
   wherein the offset calculating mechanism is configured to add the offset amount to the control signal of the new pattern, and
   wherein the control output mechanism is configured to add a control output signal transmitted in a previous round to the control signal so as to be set to a control output signal in a present round.

5. The control apparatus according to claim 2,
   wherein each of the first and second control mode calculating mechanisms is configured to first calculate a deviation between a required current corresponding to the required output and the detected coil current, and then obtain an amount of change which is necessary for a calculation of the deviation and a parameter for the first or the second control mode so as to set the amount of change to the control signal, wherein the offset calculating mechanism is configured to add the offset amount to the control signal of the new mode, and wherein the control output mechanism is configured to add a control output signal transmitted in a previous round to the control signal so as to be set to a control output signal to be transmitted in a present round.

6. The control apparatus according to claim 3, wherein each of the first and second cycle time calculating mechanisms is configured to first calculate a deviation between a required current corresponding to the required output and the detected coil current, and then obtain an amount of change which is necessary for a calculation of the deviation and a parameter for the first or the second cycle time so as to set the amount of change to the control signal, wherein the offset calculating mechanism is configured to add the offset amount to the control signal of the new cycle time, and wherein the control output mechanism is configured to add a control output signal transmitted in a previous round to the control signal so as to be set to a control output signal to be transmitted in a present round.

7. The control apparatus according to claim 1, wherein the AC motor is a three phase AC motor, and wherein each of the first and second pattern calculating mechanisms, the offset calculating mechanism, and the control output mechanism is configured to execute calculation using a dq coordinate axis based on a direction of the permanent magnet on the rotor.

8. The control apparatus according to claim 2, wherein the AC motor is a three phase AC motor, and wherein each of the first and second control mode calculating mechanisms, the offset calculating mechanism, and the control output mechanism is configured to execute calculation using a dq coordinate axis based on a direction of the permanent magnet on the rotor.

9. The control apparatus according to claim 3, wherein the AC motor is a three phase AC motor, and wherein each of the first and second cycle time calculating mechanisms, the offset calculating mechanism, and the control output mechanism is configured to execute calculation using a dq coordinate axis based on a direction of the permanent magnet on the rotor.

10. A control method for an AC motor including a rotor having a permanent magnet and a stator having a stator coil, the control method capable of controlling an inverter in a pulse width modulation scheme to feed a coil current to the stator coil, the method comprising:

a detecting step of detecting a rotational position of the rotor and the coil current;

a pattern switching step of switching a control pattern for the AC motor to a first pattern when a required output of the AC motor is smaller than a predetermined value and to a second pattern when the required output is larger than the predetermined value;

a first pattern calculating step of calculating a control signal using a parameter for the first pattern on the basis of the detected rotational position and coil current in the first pattern;

a second pattern calculating step of calculating a control signal using a parameter for the second pattern on the basis of the detected rotational position and coil current in the second pattern;

an offset calculating step of calculating a difference between a control signal obtained in an old pattern immediately before switching and a control signal obtained in a new pattern immediately after switching as an offset amount when a pattern is switched in the pattern switching step, and reflecting the offset amount on the control signal of the new pattern; and a control output step of calculating a final control output signal on the basis of calculation results of the first pattern calculating step, the second pattern calculating step, and the offset calculating step and transmitting the final control output signal to the inverter.

11. The control method according to claim 10, wherein the pattern switching step includes a mode switching step of switching the pulse width modulation scheme to a first control mode when a required output of the AC motor is smaller than a predetermined value and to a second control mode when the required output is larger than the predetermined value, wherein the first pattern calculating step includes a first control mode calculating step of calculating a control signal using a parameter for the first control mode on the basis of the detected rotational position and coil current in the first control mode, and wherein the second pattern calculating step includes a second control mode calculating step of calculating a control signal using a parameter for the second control mode on the basis of the detected rotational position and coil current in the second control mode.

12. The control method according to claim 10, wherein the pattern switching step includes a cycle time switching step of switching to a first cycle time having a comparatively short period when a required output of the AC motor is smaller than a predetermined value and to a second cycle time having a comparatively long period when the required output is larger than the predetermined value, wherein the first pattern calculating step includes a first cycle time calculating step of calculating a control signal using a parameter for the first cycle time on the basis of the detected rotational position and coil current in the first cycle time, and wherein the second pattern calculating step includes a second cycle time calculating step of calculating a control signal using a parameter for the second cycle time on the basis of the detected rotational position and coil current in the second cycle time.

\* \* \* \* \*